United States Patent

[11] 3,573,466

[72] Inventor John L. Von Feldt
Rochester, Minn.
[21] Appl. No. 746,544
[22] Filed July 22, 1968
[45] Patented Apr. 6, 1971
[73] Assignee Rochester Datronics, Inc.
Rochester, Minn.

[54] LIGHT DETECTOR DISCRIMINATOR

3 Claims, 2 Drawing Figs.

[52] U.S. Cl. 250/206, 307/311

[51] Int. Cl. G01j 1/16, H03k 19/14

[50] Field of Search 350/206; 307/311

[56] References Cited

UNITED STATES PATENTS

| | | | |
|---|---|---|---|
| 3,240,944 | 3/1966 | Wolfson et al. | 250/206X |
| 3,295,424 | 1/1967 | Biber | 250/206X |
| 3,430,106 | 2/1969 | McDowell | 307/311X |

*Primary Examiner*—Roy Lake
*Assistant Examiner*—C. R. Campbell
*Attorney*—Merchant and Gould

ABSTRACT: Two matched semiconductor junctions at least one of which is included in a transistor, connected in circuit with a pair of resistors and a capacitor so that each of the junctions receives a portion of an input current supplied by a light sensitive device, the portion received being dependent upon the ratio of the resistances, said capacitor acting to cause the transistor to switch from a normally saturated condition to a nonconducting condition when the current supplied by the light sensitive means drops below a predetermined level.

Patented April 6, 1971 3,573,466

INVENTOR
JOHN L. VON FELDT
BY
Merchant & Gould
ATTORNEYS

LIGHT DETECTOR DISCRIMINATOR

BACKGROUND OF THE INVENTION

1. Field of the Invention

In the automatic detection of document marks, such as multiple choice examinations and the like, it is necessary to utilize an interface, or a circuit which converts light intensity to electrical pulses, between a linear light detector device and logic circuitry wherein the electrical pulses are utilized. These interface circuits must be capable of differentiating between smudges, erasures, and the like on the documents and the marks or indicia which it is desired to detect.

2. Description of the Prior Art

In general, the prior art interface circuitry for use in conjunction with a linear light detector device and logic circuitry includes a flip-flop or other type of switching circuit. These switching circuits are relatively complicated and expensive. Further, it is extremely difficult to set the switching circuit so that it will switch at a desired level of input current.

SUMMARY OF THE INVENTION

The present invention pertains to light detector discriminator means including light sensitive means connected to supply current at a normal level when a high or normal level of light is impinged thereon and a lesser amount of current when a lesser level of light is impinged thereon, two matched semiconductor junctions at least one of which is included in semiconductor switching means, and capacitive and resistive components connected to cause said switching means to operate when the current supplied by the light sensitive means drops to at least a predetermined level.

It is an object of the present invention to provide a new and improved light detector discriminator.

It is a further object of the present invention to provide a light detector discriminator which is relatively simple and inexpensive to construct.

It is a further object of the present invention to provide a light detector discriminator which can be easily altered to change the level of input light at which the circuit provides an electrical output pulse.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGS.

DESCRIPTION OF THE PREFERRED EMBODIMENT

Figure 1:
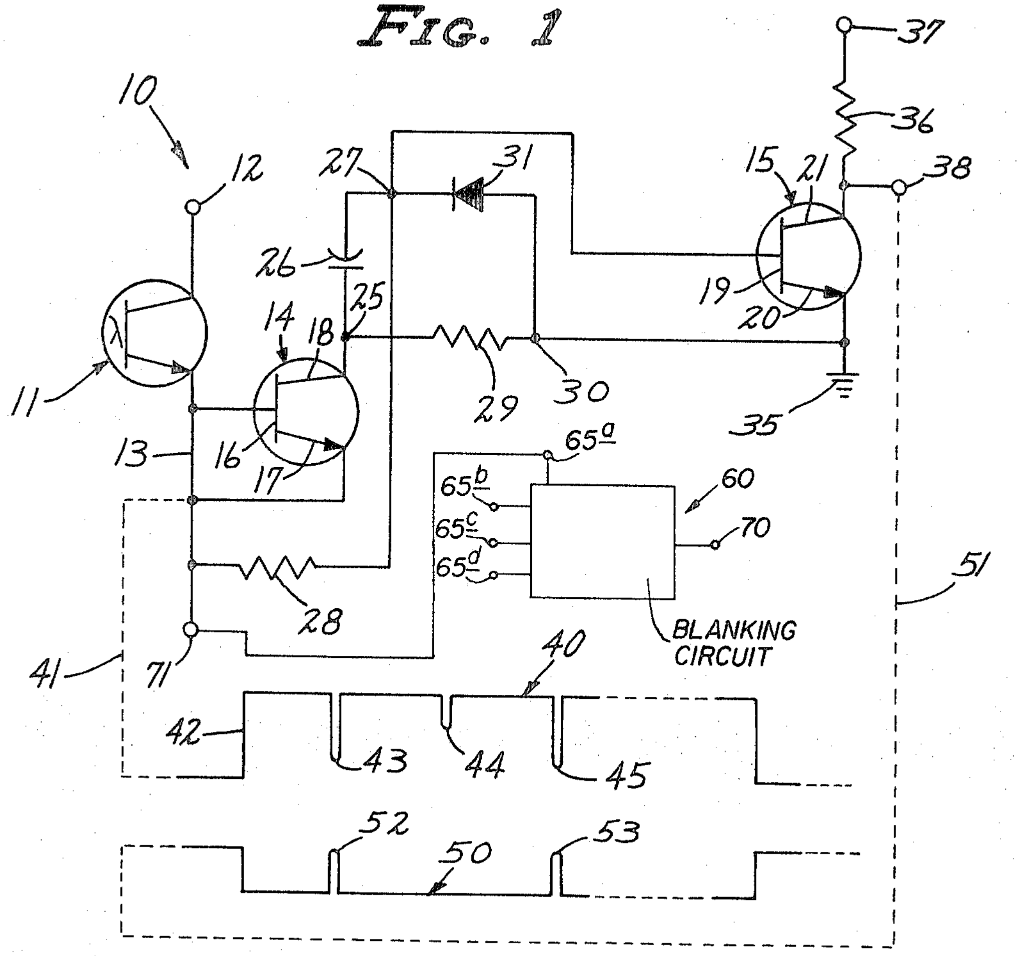
FIG. 1 is a schematic diagram of a preferred embodiment of the light detector discriminator, including an approximation of the input and output waveforms.
Figure 2:
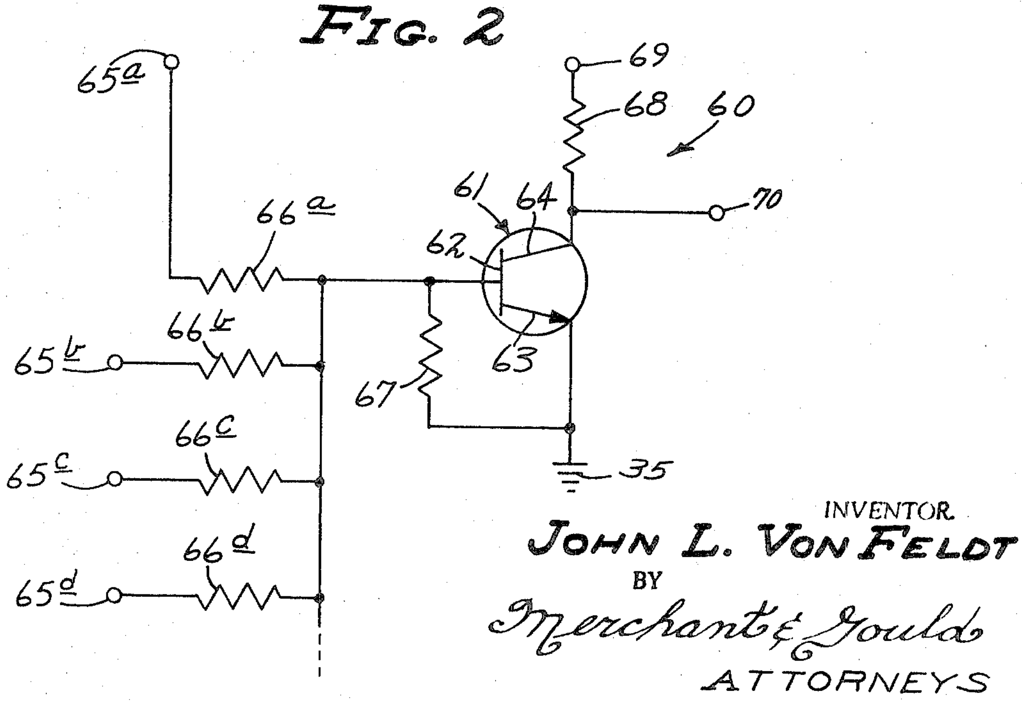
FIG. 2 is a schematic diagram of a blanking circuit.

In FIG. 1 one embodiment of a light detector discriminator generally designated 10 is illustrated. In the discriminator 10 a light sensitive means, such as a phototransistor 11, is connected to a suitable source of voltage, not shown, at a terminal 12 and the opposite side is connected to a line 13. The discriminator 10 further includes a pair or transistors 14 and 15 having at least a matched junction therein, as will be explained presently. Transistor 14 includes a base 16, an emitter 17 and a collector 18. Transistor 15 includes a base 19, an emitter 20 and a collector 21. The base 16 and emitter 17 of the transistor 14 are connected to the line 13. The collector 18 of the transistor 14 is connected to a connection point 25. One side of a capacitor 26 is connected to the connection point 25 and the other side is connected to a connection point 27. A resistor 28 is connected between the line 13 and the connection point 27. A resistor 29 is connected between the connection point 25 and a connection point 30. A semiconductor diode 31 has the cathode connected to the connection point 27 and the anode connected to the connection point 30. The connection point 30 is connected to ground 35 and to the emitter 20 of the transistor 15. The base 19 of the transistor 15 is connected to the connection point 27. The collector 21 of the transistor 15 is connected through a resistor 36 to a suitable source of voltage at an input terminal 37. An output terminal 38 is connected to the collector 21 of the transistor 15.

Some representative values for the various components of the discriminator 10 are listed below.

| | |
|---|---|
| Transistors 14 & 15 | TD101 (Sprauge) |
| Resistor 28 | 2K |
| Resistor 29 | 2.21K |
| Resistor 36 | 4.7K |
| Capacitor 26 | 10m.f.d. |
| Voltage at Point 12 | 24v. |
| Voltage at Point 37 | 3.6v. |

The above values are only representative and will vary according to the types of transistors 14 and 15, the type of light sensitive means and the additional circuitry to which the discriminator 10 is being connected.

In the operation of the discriminator 10 light is impinged upon the phototransistor 11 at a normally high level, which reduces the impedance of the phototransistor 11 and allows more current to flow therethrough from the source connected to the point 12. In general the discriminator 10 is utilized for scoring test sheets or the like which are white except for black marks made thereon to indicate certain information. The light may be reflected from the paper so that the high level of light is impinged upon the phototransistor 11 whenever the paper is in position and the amount of light is reduced substantially, for example 50 percent, when an information mark is interposed between the light source and the phototransistor 11. A typical current waveform designated 40 is illustrated in FIG. 1 with a dotted line 41 connecting the waveform 40 the the line 13 upon which it is present. A sharp step or increase in current at 42 indicated that a paper or the like has been inserted into the machine so that the normal high level of light is impinged upon the phototransistor 11. At 43 a sharp drop in current indicates that an information mark has passed between the light source and the phototransistor 11. At 44 a smaller current drop indicates that an erasure or smudge has passed between the light source and the phototransistor 11. At 45 another sharp drop in the current indicates the occurrence of another information mark.

Initially, when the normal level of light is impinged upon the phototransistor 11, the capacitor 26 charges to a value slightly lower than the voltage connected to point 12 through a circuit including phototransistor 11, the base 16-collector 18 junction of transistor 14, capacitor 26, the base 19-emitter 20 junction of transistor 15 and ground 35. Once the capacitor 26 is charged to substantially the maximum value, the capacitor 26 becomes a high impedance and the current through the phototransistor 11 is split into two parallel paths. A portion of the current flows from the line 13 through the base 16-collector 18 junction of transistor 14 and through the resistor 29 to ground 35. The remainder of the current flows from the line 13 through the resistor 28 and through the base 19-emitter 20 junction of transistor 15 to ground 35. The base 16-collector 18 junction of transistor 14 and the base 19-emitter 20 junction of transistor 15 are matched so that the voltage characteristics are approximately equal. Thus, the current flowing through the two parallel paths is dependent upon the relative values of the resistors 28 and 29. In the present embodiment the values of the resistors 28 and 29 are chosen so that approximately 47 percent of the current flows through the resistor 29 while approximately 53 percent of the current flows through the resistor 28.

When an information mark is interposed between the light source and the phototransistor 11 the sharp drop in current, indicated at 43, tends to produce a sharp drop in current through the two parallel paths. However, because of the diode voltage-current characteristics of the base 16-collector 18 junction and because the capacitor 26 is charged and the voltage thereacross tends to remain constant, the voltage across the resistor 28 tends to remain constant and, thus, the current therethrough tends to remain constant. As the current passing through the base 16-collector 18 junction and the resistor 29 tends to diminish the capacitor 26 discharges in an attempt to maintain the current through the resistor 29 constant. The instantaneous constant currents through both of the resistors 28 and 29 divert current from the base 19-emitter 20 junction.

Ideally, the amount of current required to saturate the transistor 15 is only a negligible portion of the current flowing through the resistor 28. The transistor 15 remains saturated until the current flowing through the resistor 28 equals the current flowing through the resistor 29 at which time there is no current flowing into the base 19 and the transistor 15 becomes nonconducting. Once the transistor 15 becomes nonconducting the output terminal 38, which remains near ground potential when the transistor 15 is saturated, rises to a voltage near that applied to the input terminal 37 (as illustrated in a voltage output waveform designated 50 and associated with the output terminal 38 by means of a dotted line 51). As can be seen in FIG. 1 the voltage output waveform 50 is normally near zero when the current waveform 40 is at the reference or normal level and rises to provide output pulses 52 and 53 when the current waveform 40 drops sharply at 43 and 45, respectively. It should be noted that the partial drop 44 in the current waveform 40 has no effect on the output waveform 50 since the input current does not drop sufficiently to remove base current from the transistor 15 and render it nonconducting.

The discriminator 10 will establish essentially 61 reference level of current depending upon the intensity of the light impinging upon the phototransistor 11. If the light remains at a low level for an extended period of time, the current flowing through the phototransistor 11 will remain low for an extended period of time and the capacitor 26 will discharge to a voltage whereby the entire discriminator 10 will attain a new reference level. This effect can occur between documents or papers being processed. Once the normal amount of light is again impinged upon the phototransistor 11 the discriminator 10 will return to its normal reference level. To prevent the lower reference level from affecting attached circuitry, a blanking circuit generally designated 60 may be utilized. In many instances the succeeding logic circuitry attached to the discriminator 10 will not be affected by the reduction in reference level and the blanking circuit 60 is not necessary.

The blanking circuit 60 includes a transistor 61 having a base 62, an emitter 63 and a collector 64. An input terminal **65*a* is connected to the base 62 through a resistor 66*a*. In a similar manner additional input terminals 65*b*, 65*c* and 65*d* are connected to the base 62 through resistors 66*b*, 66*c* and 66*d*, respectively, Each of the resistors 66*a* through 66*d* are approximately equal. The emitter 63 is connected to ground and a resistor 67 is connected from the base 62 to the ground 35. A resistor 68 connects the collector 64 to a suitable source of voltage, not shown, at a terminal point 69. An output terminal 70 is connected to the collector 64**.

In FIG. 1 an output terminal 71, connected to the line 13, is adapted to be connected to the input terminal **65*a* of the blanking circuit 60. In a similar fashion additional discriminators 10 are adapted to be connected to the input terminals 65*b*, 65*c* and 65*d*. The blanking circuit 60 is designed so that it presents only a negligible loading effect on the discriminator 10**. Representative values for the various components are listed below.

| | |
|---|---|
| Resistors 66a through 66d | 20K |
| Resistor 67 | 5.1K |
| Resistor 68 | 7.2K |

The blanking circuit 60 is designed so that the transistor 61 is nonconducting when the currents supplied to the input terminals **65*a* through 65*d* are all below the normal reference level. When the transistor 61 is nonconducting the voltage at the output terminal 70 is maximum and a blanking signal or pulse is supplied to logic circuitry connected to the various discriminators to prevent the inadvertent operation thereof. Whenever one or more of the discriminators attached to the input terminals 65*a* through 65*d* are at the normal reference level, sufficient current is supplied to the base 62 of the transistor 61 to cause the transistor 61 to conduct and lower the voltage at the collector 64 (and output terminal 70**) to a value near ground.

While the disclosed discriminator 10 includes a diode 31 connected across the base 19-emitter 20 junction of transistor 15 for protection against overloading, it should be understood that the circuit will operate without diode 31 if overloading is not liable to occur. It should also be noted that matched transistors 14 and 15 are illustrated because of the ease in matching such devices but the transistor 14 could be replaced with a semiconductor diode or other semiconductor junction if the voltage characteristics thereof match the voltage characteristics of the base 19-emitter 20 junction of the transistor 15.

Thus, a light detector discriminator circuit has been described which is relatively simple and inexpensive to construct and which accurately differentiates between information marks and erasures or smudges and the like. Further, the present discriminator circuit can be quickly and easily altered to operate at various levels relative to the reference level and the reference level thereof will automatically change to compensate for different degrees of light intensity.

I claim:

1. Light detector discriminator means comprising:
   a. light sensitive means connected to a suitable source of electrical energy for supplying current at a normal level when a reference level of light is impinged thereon and for supplying a lower level of current when a lesser level of light is impinged thereon;
   b. two matched semiconductor junctions at least one of which is included in semiconductor switching means; and
   c. capacitive and resistive components connected in circuit with said semiconductor junctions and said light sensitive means for causing said semiconductor switching means to switch when current at a level at least a predetermined amount less than the normal current level is supplied by said light sensitive means, the resistive components including two resistors one each connected in series with one of the two matched semiconductor junctions to form two parallel current paths, the predetermined current level less than the normal current level being determined by the resistance ratio of said resistors.

2. Light detector means as set forth in claim 1 wherein the capacitive and resistive components include first and second resistors and a capacitor connected so that one side of one semiconductor junction is connected to receive a portion of the current supplied by the light sensitive means and the other side is connected through said first resistors to a common point, the other semiconductor junction is connected at one side to normally receive the remainder of the current through said second resistor and the other side of the other semiconductor junction is connected to the common point, and one side of the capacitor is connected to a point between the first resistor and the one semiconductor junction and the other side of the capacitor is connected to a point between the second resistor and the other semiconductor junction.

3. A plurality of light detector discriminator means as set forth in claim 1 having in addition a blanking circuit connected to receive a relatively small portion of the current supplied by each of the light sensitive means and provide a blanking pulse when each of the light sensitive means is producing a current less than the normal current at least the predetermined amount.